United States Patent
Heed

(10) Patent No.: US 6,207,116 B1
(45) Date of Patent: *Mar. 27, 2001

(54) CATALYTIC PURIFICATION DEVICE

(75) Inventor: Björn Heed, Gothenburg (SE)

(73) Assignee: Enklaven AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,635

(22) Filed: Feb. 13, 1998

Related U.S. Application Data

(63) Continuation-in-part of application No. 08/637,679, filed as application No. PCT/SE96/00706 on Jun. 13, 1995, now abandoned.

(30) Foreign Application Priority Data

Aug. 4, 1994 (SE) .................................................. 9402630
Jan. 26, 1998 (SE) .................................................. 9800197

(51) Int. Cl.[7] ...................................................... F01N 3/28
(52) U.S. Cl. ......................... 422/173; 422/174; 422/177; 422/180
(58) Field of Search ................................. 422/171, 177, 422/173, 174, 180, 175, 190, 200

(56) References Cited

U.S. PATENT DOCUMENTS

| 4,017,347 | 4/1977 | Cleveland | 156/89 |
|---|---|---|---|
| 4,533,584 | 8/1985 | Takeuchi et al. | 428/116 |
| 4,702,892 | 10/1987 | Betz | 422/171 |
| 4,867,949 | 9/1989 | Betz | 422/171 |
| 4,976,929 | 12/1990 | Cornelison et al. | 422/174 |
| 5,055,278 | 10/1991 | Reidick | 423/235 |
| 5,093,178 | 3/1992 | Sundstrom et al. | 428/156 |
| 5,108,717 | * 4/1992 | Deller et al. | 422/173 |
| 5,250,489 | * 10/1993 | Dalla Betta et al. | 422/173 |
| 5,262,131 | 11/1993 | Bayer et al. | 422/175 |
| 5,336,472 | 8/1994 | Toyoda et al. | 422/177 |
| 5,584,175 | 12/1996 | Carlborg et al. | 60/274 |
| 5,593,646 | 1/1997 | Koshida et al. | 422/177 |
| 5,700,434 | * 12/1997 | Gaiser | 422/173 |

FOREIGN PATENT DOCUMENTS

| 40 31 042 | 4/1992 | (DE) . |
| 0 590 171 | 4/1994 | (EP) . |
| WO 93/22544 | * 11/1993 | (WO) . |

* cited by examiner

Primary Examiner—Hien Tran
(74) Attorney, Agent, or Firm—Nields & Lemack

(57) ABSTRACT

Catalytic purification device for purifying air or gas by heat treatment with a catalyst. The catalyst is carried on a patterned strip or membrane that is folded in accordion style, forming two groups of parallel flow channels with simple connections for incoming and outgoing flows. Good heat economy is achieved by heat exchange between the incoming and outgoing flow of gases.

11 Claims, 4 Drawing Sheets

CATALYTIC PURIFICATION DEVICE

This Application is a Continuation-in-part of U.S. Ser. No. 08/637,679 filed Apr. 2, 1996, now abandoned, which is a 371 of PCT/SE95/00706, filed Jun. 13, 1995.

BACKGROUND OF THE INVENTION

Solvents and other organic compounds can be removed from air by oxidation or combustion. The impurities are made to react with oxygen in the air and they are thereby converted to harmless water and carbon dioxide. A high temperature is normally required for the reaction to proceed. When the impurity concentration is higher than the so-called lower explosive limit, but still under the upper explosive limit, the heat developed during the reaction is sufficient to maintain a high enough temperature, once the reaction has been initiated by ignition.

For safety reasons, however, most normal industrial processes take care to remain comfortably below this explosive limit when air containing solvents or other combustible vapors are involved. This means that emissions of ventilating air containing impurities are virtually always below the explosive limit, usually far below.

Ignition is not sufficient to produce combustion of the impurities under these circumstances. The impurity content is too low for the reaction to proceed on its own. One way to produce combustion despite this is to heat the air to a temperature of 750–1000° C. This can be accomplished with electricity or with the help of a gas or oil burner. However, this drives up energy costs, even if heat exchangers are often used to recover heat from the treated air and to use this heat for heating the incoming, not yet treated air.

One way to reduce the reaction temperature and thus the energy consumption is to let the reaction proceed with the help of catalysts. For example, contact with metals from the platinum group can provide a good reaction rate even at 200 or 300° C. Catalysts consisting of various blends of metal oxides are also used. This field is quite large and new catalysts and ways of handling these catalysts to provide better catalytic activity are being developed constantly.

However, temperatures well above room temperature are still normally needed for the reaction rate to be satisfactory.

SUMMARY OF THE INVENTION

The invention presented here involves a device for catalytic oxidation in which a preheating heat exchanger is an integrated part of the device. In addition to the oxidation of organic substances, the device is also suitable for other combined heat exchange and catalytic treatment of gases, for example for the so-called selective reduction of nitrogen oxides with ammonia or other reducing nitrogen compounds. The device is well suited to treating engine exhaust gases, whether they have high oxygen contents (diesel engines) or low oxygen contents (Otto engines) This is particularly true when the temperature of the exhaust or the properties of the catalyst are such that satisfactory results cannot be achieved without heating.

The key to the invention is a membrane that separates incoming air or gas mixture from outgoing air or gas mixture. The membrane is constructed such that heat can pass from the outgoing air to the incoming air, as in an ordinary recuperative heat exchanger. Preferably, air flow around the membrane is so arranged that heat exchange occurs in a so-called countercurrent process, in which the coldest part of the outgoing stream heats the incoming stream just as it is coming in, while the warmer, not yet cooled part of the outgoing stream heats the incoming stream at a late stage. This produces a high degree of heat exchange and good heating efficiency.

Good heat exchange also requires that the gas have good transfer contact with the surface of the membrane. In accordance with this invention, the membrane surface is coated with a suitable catalyst, which also achieves good contact with the gas stream, which creates favorable conditions for achieving a good degree of reaction.

Thus, according to the present invention, the membrane serves three main purposes:

1. Separating an incoming stream from an outgoing stream;
2. Transferring heat from outgoing air (gas) to incoming;
3. Holding the catalyst, which is provided with good contact with the passing air (gas).

The membrane may well be made of a thin metal sheet or foil. such as stainless steel, which is coated with a thin layer of catalyst. The membrane may also consist of a ceramic impregnated or coated with a catalyst. Either just one side or both sides of the membrane can be coated with the catalyst.

The technique of coating surfaces with thin and economical coatings of catalysts is well developed and used, for example, in the production of conventional automobile catalysts.

DETAILED DESCRIPTION OF THE INVENTION

Figure 1:
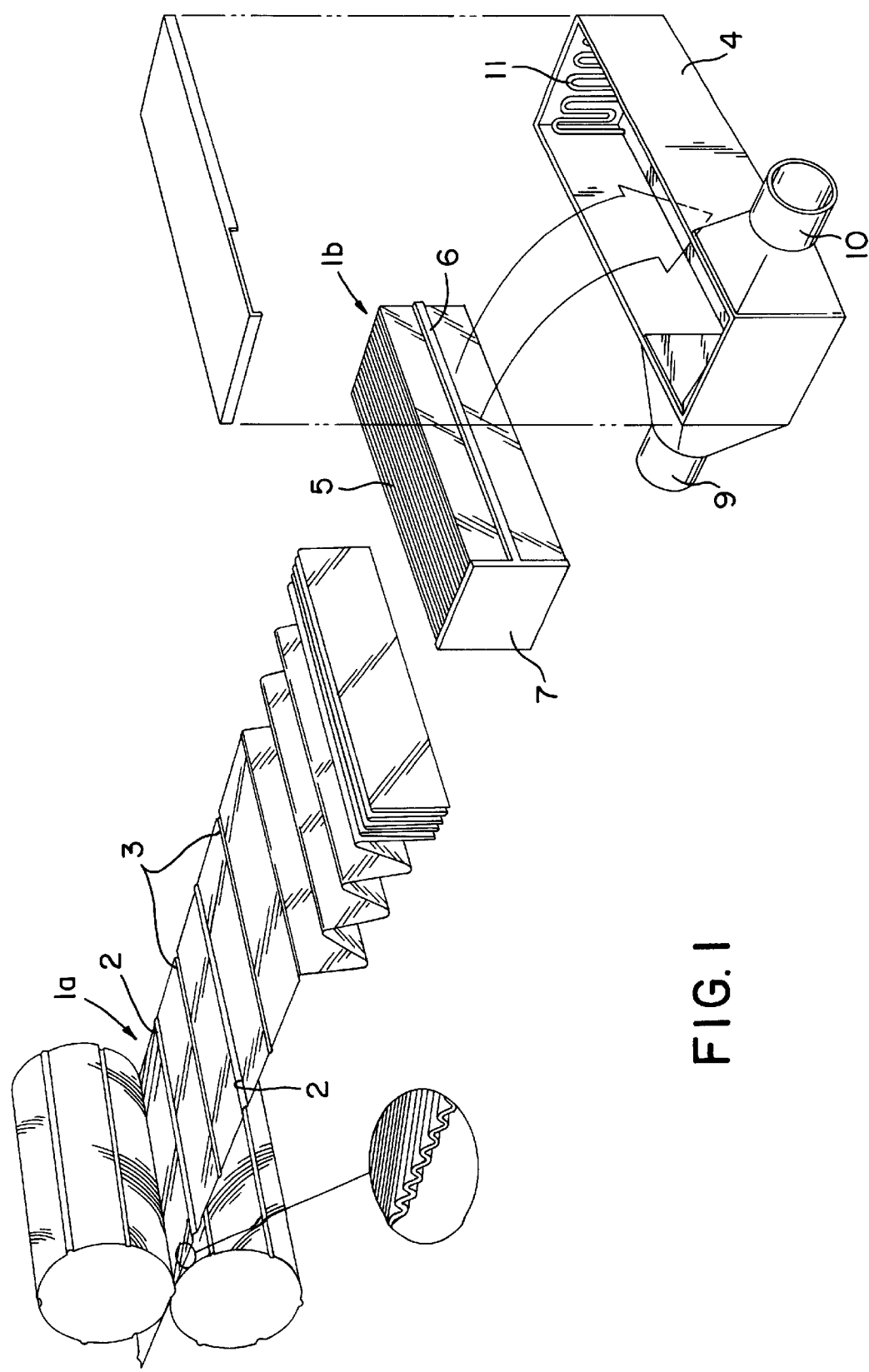
FIG. 1 is a perspective view, partly exploded, of the catalytic purification device of the present invention.
Figure 2:
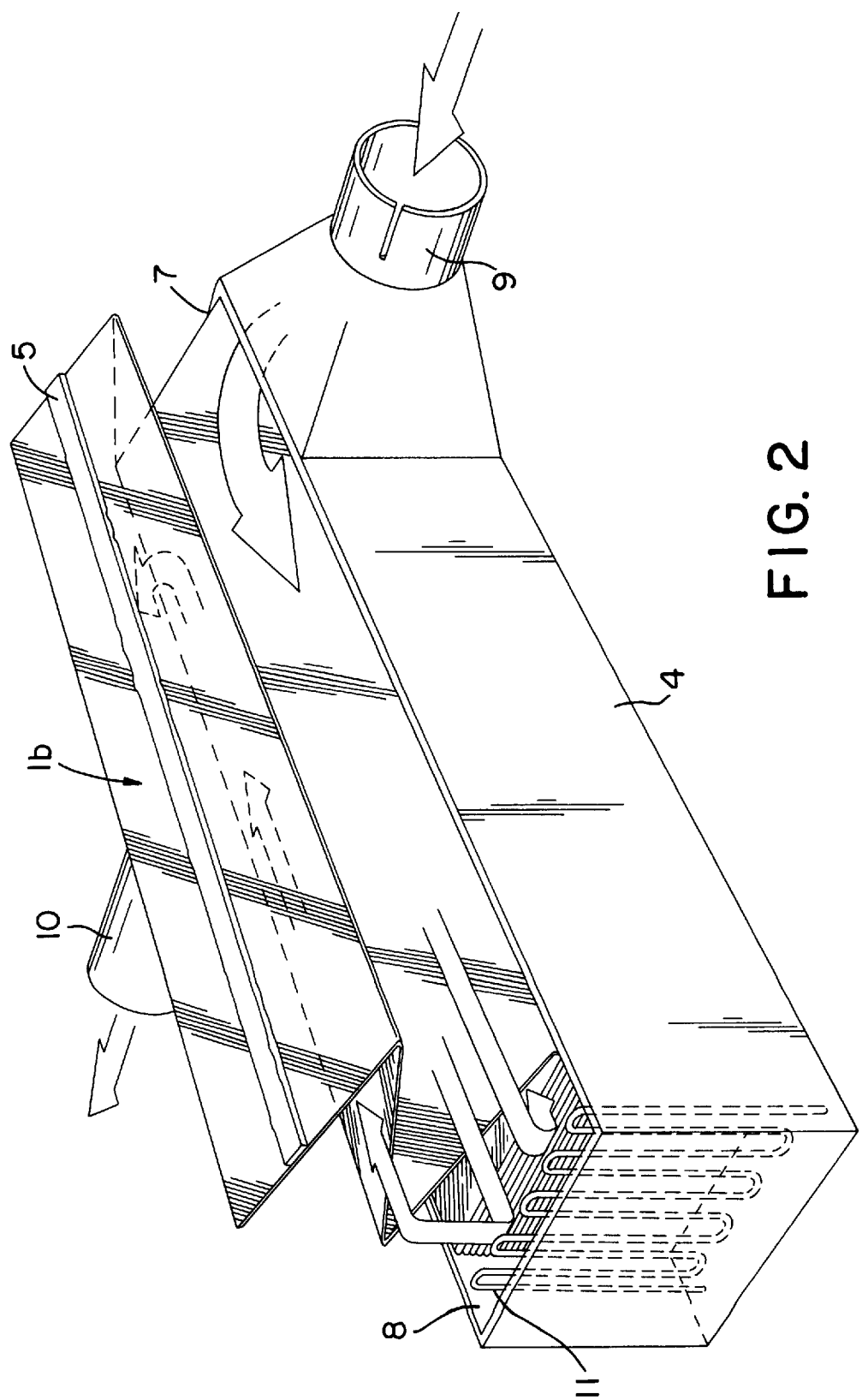
FIG. 2 is a perspective view of the catalytic purification device of the present invention in a more assembled condition.
Figure 3:
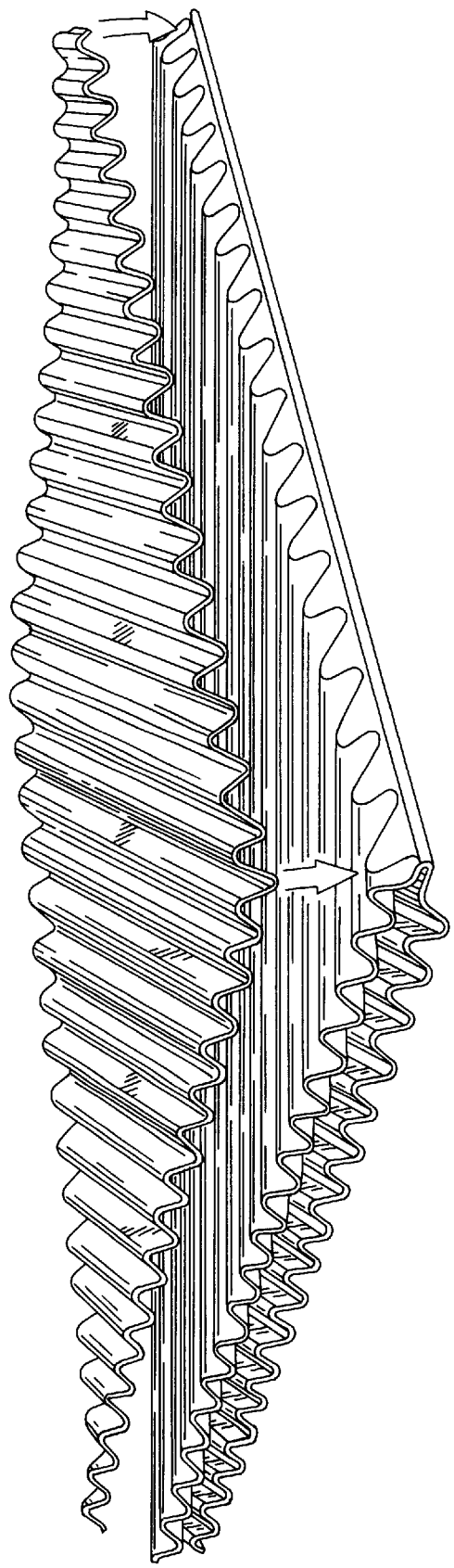
FIG. 3 is a perspective view of the membrane of the present invention.

One design of the invention is shown in FIGS. 1 and 2. Here the membrane is made of a long metal strip la, which is shaped by pressing, rolling, or similar process, making it corrugated. The corrugation runs at an angle across the strip. The strip is then folded in zigzag form so that it forms a bundle lb. In this way, the corrugations in adjacent layers lie crosswise to one another, serving as spacers and forming channels of strip that are separated from one another, where air (gas) can flow (see FIG. 3). The flow patterns in these channels are such that flow in the channels mixes constantly, thus achieving good contact with the channel walls. As shown in FIG. 1, to facilitate bending of the strip, the corrugation can be discontinued at regular intervals and replaced with alternately directed folding notches 2 and 3.

The strip is coated with the catalyst and enclosed in a heat insulated outer container 4 (the insulation is not shown in the Figures). The strip bundle lb is sealed on the two sides 5 and 6 that are parallel to the flow and at the inlet and outlet end 7. However, the other end of the bundle is not sealed, but ends in a reversing chamber 8 (FIG. 2). At the inlet/outlet end 7 the outer container 4 is equipped with an attachment 9 for connecting the incoming air (gas) and another 10 for connecting the outgoing air (gas). Due to the folding of the strip, connection to all channels on one side of the bundle lb is from the side of the bundle is simple, so that the two attachments 9 and 10 each connect to opposite sides of the strip.

A heating element 11 is also located in reversing chamber 8. In the design shown here, this element consists of electric heating coils, but other heating devices can also be used, such as gas or oil burners. As an alternative, the reversing chamber and the treated gas stream can be heated by supplying warm air or gas from an external source.

Figure 4:
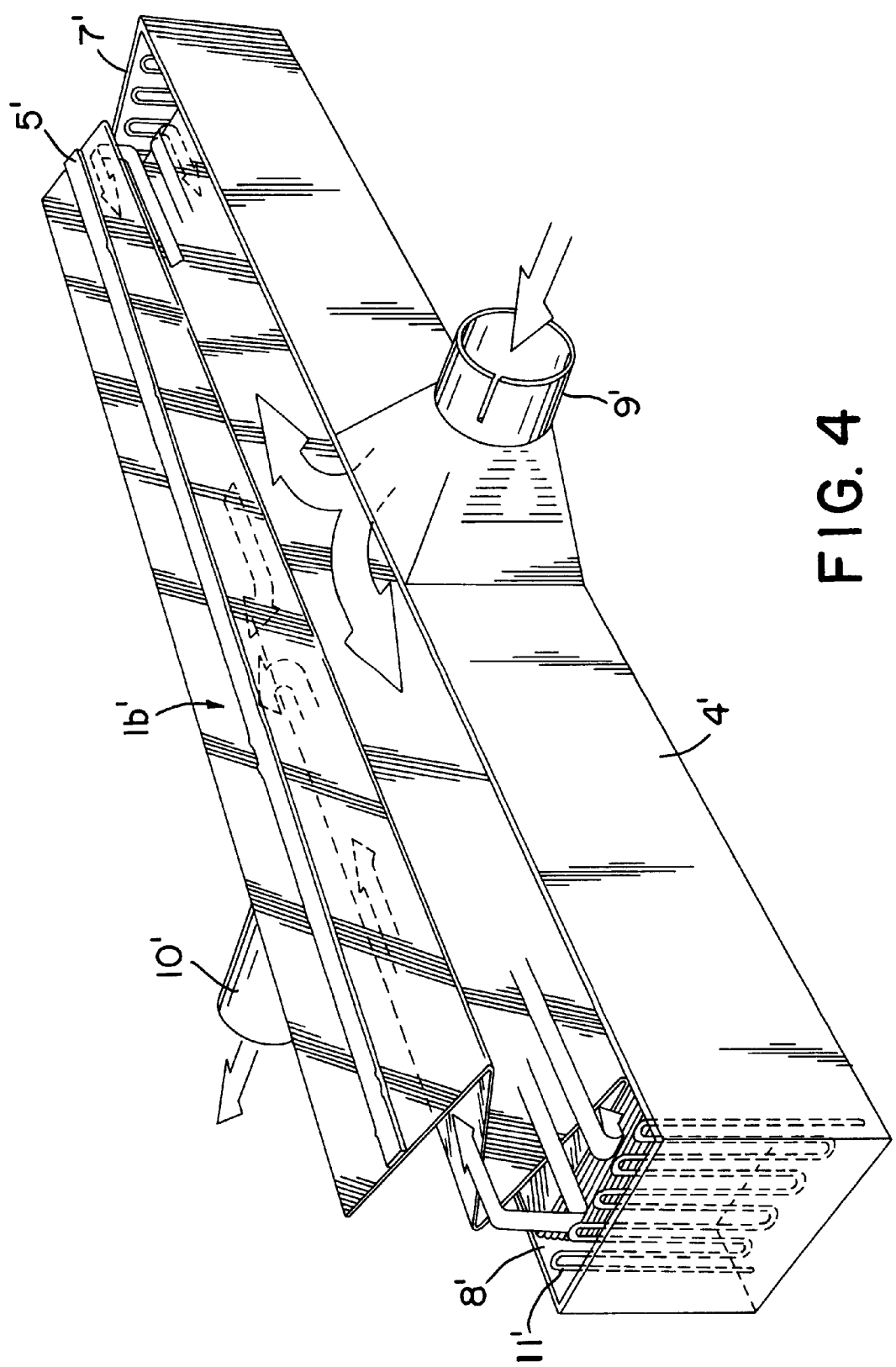
FIG. 4 is a perspective view of an alternative embodiment of the catalytic purification device of the present invention.

FIG. 4 illustrates an alternative embodiment of the present invention. In this alternative embodiment, the bundle 1b' extends to the right as well as to the left across the inlet 9' of the outer container 4' as shown. Stated differently, the inlet 9' (and outlet 10') are substantially centrally located along the length of the outer container 4'. Two reversing chambers 8' are provided, one at each end of outer container 4'. Gas tempering or temperature regulating means 11' is arranged at each reversing chamber 8'. The gas tempering or temperature regulating means can be heating means, such as electric heating coils or gas or oil burners, and/or cooling means, depending upon the temperature of the fluid which is intended to be treated by the catalyst. Because the bundle 1b' extends to the right and left across the outlet 10', high gas temperature at both ends of the bundle can be achieved with reduced sealing problems. The device operates in a manner similar to that of the device of FIG. 2 (as discussed below), with the gas flow depicted by the arrows shown in FIG. 4.

Operation of the unit is described below on the basis of FIG. 2:

Before the unit is started up, the reversing chamber 8 is heated by heating unit or heating element 11 to a temperature that is just above the temperature that is needed for the reaction in question, considering the catalyst that is used. The temperature in the reversing chamber is subsequently maintained at this temperature by regulating the heat that is supplied by heating unit 11 or by the heat that is generated from the chemical reactions during operation of the unit.

Impure air is supplied through intake attachment 9 and passes in toward reversing chamber 8 through the channels on one side of bundle lb and in this way it is heated up to the reaction temperature. At the same time that cold air (gas) flow in toward reversing chamber 8, warm air flows counter to it out toward outlet attachment 10 on the other side of the bundle. The result is that heat is transferred from the outgoing air stream to the incoming stream. Air passing through the device is heated successively to the temperature of the reversing chamber, after which the temperature is reduced successively after it has left the reversing chamber.

By good heat exchange between the outgoing and incoming air (gas), the local temperatures of these streams are caused to be close to each other. Consequently, not much additional heat is needed in reversing chamber 8. Thus, operation of the unit is extremely economical. If the chemical reaction develops sufficient heat, then no additional heating at all is required.

At the same time that the air (gas) is being heated to the correct temperature in the unit, it is also moving over the catalyst-coated surface, which is basically at the same temperature. Moreover, due to the corrugation of the strip, flow past the catalyst surface also proceeds in such a way that there is constant mixing in the crosssectional direction of the channel, so that the air (gas) comes into good contact with the catalyst. This creates good conditions for the reaction and the device produces a high degree of purification.

When much heat is developed by the reaction in the device, for example due to a high concentration of substance undergoing oxidation, no additional heat need be supplied in reversing chamber 8. At the same time, the temperature in the reversing chamber is dependent, to a certain extent, on the concentration of the substance in the air. This is particularly true if the strip is coated with catalyst only on the outlet side, so that heating of the incoming impure air occurs without contact with the catalyst and the reaction occurs only after the flow has passed the reversing chamber.

Generation of a large quantity of heat then produces a high temperature in reversing chamber 8 and in the sections of the bundle adjacent to it. If, however, the strip bundle has a coating of catalyst on both sides or at least on the inlet side of the bundle, this temperature is lower. Here, instead, the heating occurs under constant contact with the catalytic surface and the reaction takes place when the flow achieves the proper temperature. The excess heat is constantly transferred to the outgoing air (gas) on the other side of the bundle. When everything that can react has already reacted, there is no additional temperature increase and the subsequent movement toward the reversing chamber occurs with no additional temperature increase. In this way, the device is self-regulating in temperature and adjusts itself to a working temperature that is suitably just above the temperature at which the main reaction occurs. The temperature is somewhat higher at a high flow rate than at a low one.

Thus, with high and variable contents of substances to be oxidized, it can be an advantage to have the inlet side of the bundle coated with catalyst. This protects the device from high temperatures that can harm the catalyst, among other things. Coating the outlet side then creates a reserve capacity and contributes to an increased degree of purification.

If the stream that is to be purified contains some substance that requires higher treatment temperatures than the main part of the impurities, on the other hand, it can be an advantage to coat only the outlet side of the bundle with the catalyst. In that way, high temperatures can be achieved even with a readily reacting fuel. A similar effect can also be achieved using different catalysts on the two sides of the bundle, whereby the catalyst used for the heat-generating reaction is placed on the outlet side of the bundle and the catalyst that is needed for the reaction that requires a high temperature is placed on the inlet side of the bundle.

The main part of the chemical reaction occurs in the warm section of bundle lb. That part or inlet/outlet end 7 of the bundle that is closest to the inlet and outlet attachments is normally at a low temperature and, thus, is not catalytically active, but simply serves as a heat exchanger. Consequently, in order to save costly catalyst, it is possible to limit the catalytic coating to that part of the strip that is closest to the reversing chamber. With high contents of heat generating impurities, however, this means that the temperature in the device can become high, just as in the case in which the coating is applied only on the outlet side of the strip.

This invention involves a device that, in a cost-efficient manner, combines a heat exchanger with a catalyst-supporting material, where the active surface is large within a limited volume and where the setup of the process can control the temperature in the desired manner. The possibility of folding a patterned strip simply and economically to produce many easily connected alternating channels with a large surface area, thereby achieving good operating efficiency, is described above. However, the angular corrugation that is described is not the only way to achieve a suitable spacing between the various layers in the bundle. Many other patterns with alternating protrusions and depressions can create the same results. A low pressure drop can be produced in the flow through the device if the corrugation or other structure is arranged in such a way that the angle against the direction of flow is small. However, this normally reduces heat transfer to the walls, which must be compensated with additional surface area. Depending on the circumstances, this larger area may actually be desirable, to make room for additional catalyst.

In the description above the underlying assumption has been that the intended reaction takes place at a temperature which is higher than the inlet temperature of the air (or gas). In some cases, however, it is more advantageous that the reaction takes place at a temperature that is below that of the incoming gas temperature. This is the case for instance when the incoming gas temperature is so high that the resulting temperature at reaction may be harmful to the catalyst. In such cases, cooling devices could be used in the reversing chamber(s). A suitable cooling device includes a contact area within the reversing chamber cooled by an external cooling fluid in the gas or liquid state, or a heat pump device. Cooling may also be accomplished by direct addition of cold air or gas into the reversing chamber(s). As in the case with heated reversing chambers, the heat exchange that takes place between the gas streams that flows towards and from the reversing chamber(s) greatly facilitates the achievement of desired temperature in the reversing chamber(s) and the adjacent catalyzed membrane area.

What is claimed is:

1. A catalytic device for treatment of gases, comprising:
   (a) a housing having first housing end and an inlet and an outlet spaced from said inlet;
   (b) a zigzag folded membrane at least partly covered with catalyst and forming a bundle with a first end and second end, said bundle having two sides containing folding lines and forming two sets of flow channels, one set on each side of said membrane, each of said sets of flow channels opening towards one each of said two sides of said bundle;
   (c) said inlet of the housing connecting to one of said sides of said bundle and said outlet of the housing connecting to the other of said sides of the bundle; and
   (d) a reversing chamber located at said first end of said bundle, the chamber volume being defined between said first housing end and said first end of said bundle, so that gas entering said inlet flows through one set of said channels to said reversing chamber and then through the other set of said channels to said outlet, thereby enabling heat exchange to take place between gas going towards and from said reversing chamber.

2. The catalytic device of claim 1, further comprising means for temperature regulation in said reversing chamber.

3. The catalytic device of claim 1, further comprising means for introducing gas in said reversing chamber.

4. The catalytic device of claim 2, wherein said means for temperature regulation comprises an electric heater.

5. The catalytic device of claim 2, wherein said means for temperature regulation comprises a burner for gas or liquid fuel.

6. The catalytic device of claim 2, wherein said means for temperature regulation comprises supplying gas into said reversing chamber.

7. The catalytic device of claim 1, wherein said membrane has a first side and a second side, and wherein both said first and second sides are covered with said catalyst.

8. The catalytic device of claim 1, wherein said membrane has a first side and a second side, and wherein only one of said first and second side is coated with said catalyst.

9. The catalytic device of claim 7, wherein the catalyst coated on said first side is different from the catalyst coated on said second side.

10. The catalytic device of claim 1, wherein said membrane is corrugated.

11. The catalytic device of claim 1, wherein said housing has a second housing end spaced from said first end, and wherein said catalytic device further comprises a second revering chamber located at said second end of said bundle, the second reversing chamber volume defined between said second housing end and said second end of said bundle.

* * * * *